Jan. 21, 1947.　　P. R. PIERSON ET AL　　2,414,555
METAL ENCLOSED SWITCHGEAR
Filed Feb. 2, 1943　　2 Sheets-Sheet 2

WITNESSES:

INVENTORS
Paul R. Pierson and
Gilbert C. Sinclair.
ATTORNEY

Patented Jan. 21, 1947

2,414,555

UNITED STATES PATENT OFFICE 2,414,555

METAL ENCLOSED SWITCHGEAR

Paul R. Pierson, Wilkinsburg, and Gilbert C. Sinclair, Murrysville, Pa., assignors to Westinghouse Electric Corporation, East Pittsburgh, Pa., a corporation of Pennsylvania Application February 2, 1943, Serial No. 474,484

6 Claims. (Cl. 200—50)

Our invention relates, generally, to switchgear and, more particularly, to metal-clad switchgear of the type in which switchgear apparatus, such as oil circuit breakers, is enclosed in metal cells or compartments.

In such switchgear, the circuit breakers are usually removable from the compartments for inspection and repair, and it is essential that the breakers be isolated from all energized conductors before such removal. In switchgear of the type known as "vertical lift," each circuit breaker unit may be disconnected from the power conductors by lowering the breaker in the cell prior to its removal from the cell. However, the raising and lowering of heavy duty circuit breakers having large tanks containing oil is rather difficult and requires complicated and expensive elevating mechanisms.

In order to avoid the use of such elevating mechanisms, isolating or disconnecting switches have been proposed for mounting in the cell in such a manner as to permit the circuit breaker terminals to be disconnected from the energized conductor terminals without moving the circuit breaker. However, the isolating switches previously proposed are complicated in structure, and, since they are mounted within the cells, are not readily accessible for inspection and repair.

An object of our invention, generally stated, is to provide switchgear apparatus which shall be simple and efficient in operation and which may be economically manufactured and installed.

A more specific object of our invention is to provide a simplified and improved means for isolating an enclosed circuit breaker from power conductors.

Another object of our invention is to provide an isolating switch for an enclosed circuit breaker which shall be removable from the enclosed cell with the circuit breaker unit.

A further object of our invention is to provide for interlocking the operating mechanisms of a circuit breaker and its associated isolating switch.

Other objects of our invention will be explained fully hereinafter or will be apparent to those skilled in the art.

In accordance with our invention, telescoping contact members are so mounted on the breaker terminals that they can be extended or retracted to complete or disconnect the circuits between the breaker terminals and the stationary disconnecting contacts in the cell structure. The telescoping contact members and their operating mechanism are mounted on the breaker unit and are removable from the cell with the breaker. The operating mechanisms for the breaker and the disconnecting device are so interlocked that the disconnecting device cannot be extended or retracted with the breaker closed, and the breaker cannot be closed with the device in an intermediate position.

For a fuller understanding of the nature and objects of our invention, reference may be had to the following detailed description taken in conjunction with the accompanying drawings, in which.

Figure 1:
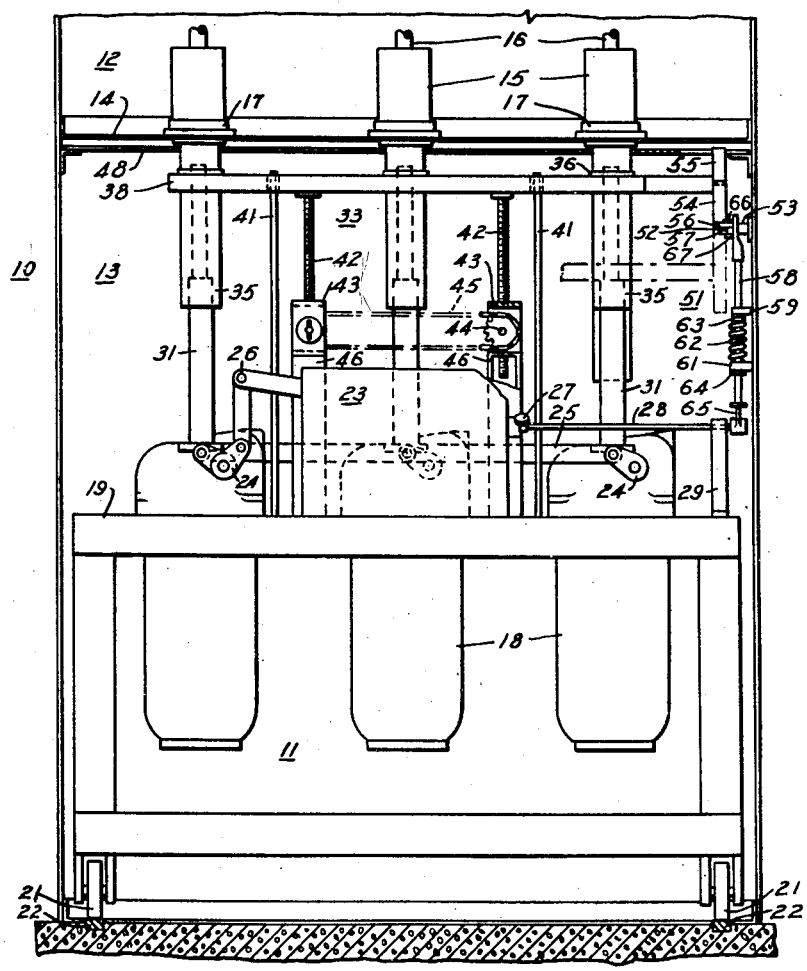
Figure 1 is a view, partially in front elevation and partially in section, of a metal-clad switchgear structure embodying our invention.
Figure 2:
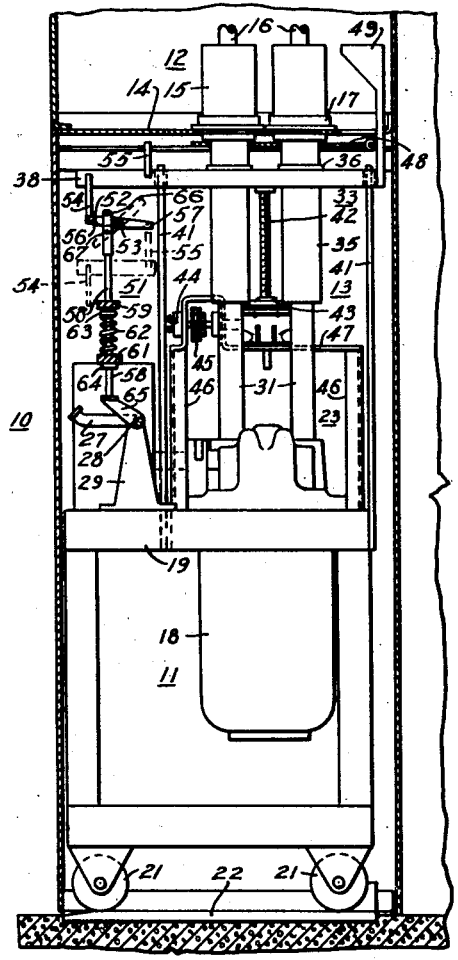
Fig. 2 is a view, partially in end elevation and partially in section, of the structure shown in Fig. 1; and, Fig. 3 is an enlarged view, in section, of the disconnecting device for one terminal of a circuit breaker.

Referring to the drawings and, particularly, to Figs. 1 and 2, the structure shown therein comprises a cell 10 for enclosing a removable circuit breaker 11. As shown, the cell 10 is preferably comprised of sheets supported by angle bars and is divided into an upper compartment 12, only a portion of which is shown, and a lower compartment 13 which are separated by a metal partition 14. A plurality of insulating supports 15 for conductors 16 are fixed in the partition 14.

Figure 3:
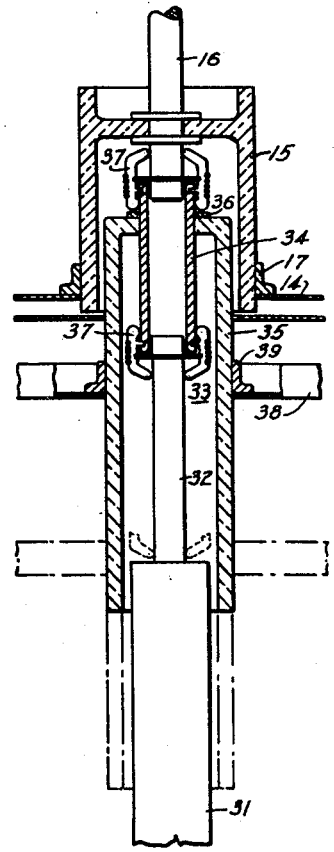

In accordance with the usual practice, the terminal conductors 16 may be connected to bus bars or other power conductors (not shown). As shown in Fig. 3, each one of the insulating supports 15 comprises a cylindrical bushing comprised of insulating material, such as porcelain, and having a partition therein for supporting the conductor 16. A metal flange 17 is provided for securing the bushing 15 to the metal partition 14.

As shown, the circuit breaker 11 is of the three-phase type and comprises three individual tanks 18 which are mounted in a framework 19 supported by wheels 21. Thus, the circuit breaker may be rolled into and out of the cell 10 on tracks 22 provided in the foundation or floor of the cell.

A suitable mechanism 23 for operating the contact members of the circuit breaker, which are disposed in the tanks 18, is mounted on the framework 19. As shown, each breaker tank is provided with an operating crank 24, and all of the cranks are connected together by a connecting link 25 to be simultaneously operated by the mechanism 23 through a suitable linkage 26. The mechanism 23 may be of any standard type well known in the art and, therefore, will not be described in more detail in the present specification.

In accordance with the usual practice, the mechanism 23 is provided with a tripping device for opening the contact members of the circuit breaker. A manually operated lever 27 is provided for actuating the tripping mechanism. It will be understood that the tripping mechanism may also be electrically operated in a manner well known in the art. The tripping lever 27 is connected to a shaft 28 which is rotatably mounted in a support 29 on the circuit breaker frame 19. The function of the shaft 28 will be explained more fully hereinafter.

As shown, each phase of the circuit breaker unit is provided with a pair of terminals 31 which are externally mounted on the tanks 18 of the circuit breaker. The terminals 31 are each provided with an uninsulated portion 32 which extends above the insulated portion of the terminal.

In order that the circuit breaker terminals may be connected to and disconnected from the corresponding conductor terminals 16 without changing the position of the circuit breaker unit in the cell, we have provided an isolating or disconnecting device 33 which may be operated to connect the breaker terminals and the conductor terminals without elevating the complete breaker unit in the cell. The disconnecting device 33 comprises a plurality of telescoping or extensible terminals which may be extended or collapsed to complete or disconnect the circuits between the breaker terminals and the stationary conductor terminals in the cell.

As shown in Fig. 3, each disconnecting terminal comprises a cylindrical tube 34 which is preferably comprised of copper or other suitable conducting material and is mounted in an insulating sleeve 35 which telescopes over the circuit breaker bushing 31. The sleeve 34 is secured in the upper end of the insulating sleeve 35 by means of a metal collar 36.

Primary disconnecting contacts 37 of the type ordinarily used in metal-clad switchgear are provided at each end of the metal sleeve 34. Thus, when the sleeve 34 is in its elevated or extended position, as shown in Fig. 3, it bridges the stationary terminal 16 and the breaker terminal 32, thereby completing an electrical circuit between these two terminals. When the metal sleeve 34 and its supporting insulating sleeve 35 are in their lowered or retracted position, as indicated by the broken lines, the circuit between the terminals 16 and 32 is interrupted.

The porcelain sleeves 35 are all mounted in an elevating framework 38. A flanged ring 39 surrounds each porcelain sleeve 35 for securing it in the elevating framework 38. Guide members 41 are provided on the circuit breaker frame 19 for directing the movement of the elevating frame 38.

An elevating or actuating mechanism is provided for raising and lowering the frame 38 and the bridging contact members of the disconnecting device. The elevating mechanism comprises a pair of jack screws 42 which may be raised and lowered by jacks 43. In this instance, one of the jacks is driven by a shaft 44 and the other is driven through a chain 45 connected to the shaft 44. The shaft 44 may be rotated by a removable crank (not shown), which may be placed on the end of the shaft. The entire elevating mechanism may be mounted on the circuit breaker frame by vertical supports 46 and horizontal supports 47.

Thus, the entire elevating or actuating mechanism and disconnecting contact members may be removed from the cell with the circuit breaker unit when the disconnecting device is in its lowered position. In this manner, the disconnecting device and its operating mechanism, as well as the circuit breaker unit, may be removed from the cell for inspection and repair.

In accordance with the usual practice, a shutter 48 is provided in the upper part of the lower compartment 13 for closing the openings in the insulating bushings 15 to prevent access to the terminals 16 when the circuit breaker unit is removed from the cell. As shown, the shutter 48 is of the slidable type and is actuated by a cam 49 carried by the frame 38 of the disconnecting device. Thus, when the disconnecting device is lowered or retracted, the shutter 48 is closed to prevent access to the energized conductor terminals.

In order to prevent improper operation of the disconnecting device, an interlocking mechanism 51 is provided for preventing either the opening or the closing of the circuit between the breaker terminals 32 and the conductor terminals 16, while the circuit breaker contacts are closed. The present interlocking device also prevents closing of the contact members of the circuit breaker, while the disconnecting device is in an intermediate position. However, the circuit breaker can be operated in the usual manner to close its contact members for testing purposes when the disconnecting device is in its fully lowered or retracted position.

The interlocking device comprises a bar 52 which is pivotally mounted on a side of the cell 10 by means of a support 53. A downwardly extending member 54 and an upwardly extending member 55 are provided on the elevating frame 38 for engaging horizontally extending projections 56 and 57, respectively, on the opposite ends of the bar 52. A vertically disposed shaft 58 is slidably mounted in guide members 59 and 61 on the side of the cell 10.

The shaft 58 is biased upwardly by a spring 62, the upper end of which engages a collar 63 on the shaft 58 and the lower end of which rests on the guide member 61. A collar 64 on the shaft 58 engages the guide member 61 to limit the upward movement of the shaft. The lower end of the shaft 58 engages an arm 65 which is secured to the end of the shaft 28 opposite the tripping arm 27. The upper end of the shaft 58 is provided with a pair of spaced pins 66 and 67 one of which is disposed above and the other below the bar 52, thereby loosely connecting the bar 52 and the shaft 58.

Referring to Fig. 2, it will be seen that when the frame 38 of the disconnecting device is lowered, or retracted the member 54 engages the projection 56 of the bar 52, thereby actuating the bar to the position indicated by the broken lines and forcing the shaft 58 downwardly to compress the spring 62. The downward movement of the shaft 58 actuates the arm 65 to operate the tripping mechanism of the circuit breaker, thereby opening the contact members of the circuit breaker before the bridging members of the disconnecting device are lowered to a position to interrupt the circuit established by the bridging members through the breaker terminals and the conductor terminals.

When the disconnecting device is in its completely lowered or retracted position, the downwardly extending member 54 clears the projection 56 of the bar 52, and the spring 62 raises the bar to its horizontal position, as shown by the full lines in Fig. 2. Thus, the tripping mechanism of the breaker is released and the breaker may be closed, if desired.

However, it is impossible to raise the disconnecting device to establish a circuit between the breaker terminals and the conductor terminals by means of the disconnecting device, while the circuit breaker contacts are closed, since any upward movement of the elevating frame 38 will cause the member 55 to engage the projection 57 on the bar 52, thereby actuating the bar 52 to force the shaft 58 downwardly to operate the tripping mechanism of the breaker. When the elevating frame 38 is in its fully raised or extended position, the member 55 clears the projection 57, thereby permitting the spring 62 to raise the shaft 58 and actuate the bar 52 to its horizontal position. In this manner the tripping mechanism is released after the disconnecting device is in its fully closed position and the contact members of the breaker may be closed in the usual manner. It will be seen that the breaker cannot be closed while the disconnecting device is in an intermediate position, since the tripping mechanism is not released by the clearance of the bar 52 until the elevating frame 38 is in substantially its fully lowered or fully raised position, thereby clearing the bar 52 from the members 54 or 55.

When the elevating frame 38 of the disconnecting device is in its fully lowered or retracted position, the breaker unit and the complete disconnecting device may be removed from the cell in the usual manner without interference by the interlocking mechanism. Thus, the disconnecting device and its operating mechanism may be made available for inspection as well as the circuit breaker mechanism. The present structure affords all the usual advantages of metal-enclosed switchgear without requiring the provision of elevating mechanism suitable for raising and lowering the complete circuit breaker unit. As explained hereinbefore, circuit breakers suitable for use in high voltage and high current capacity systems are necessarily heavy in weight and require complicated and expensive elevating mechanisms. Therefore, the present disconnecting device is particularly suitable for use with heavy duty circuit breakers, although it may be utilized with circuit breakers of any type.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. Switchgear apparatus comprising, an enclosing cell, a circuit breaker unit removably disposed in the cell, said circuit breaker having terminals externally mounted thereon in fixed relation thereto, conductor terminals fixed in the cell, bridging members carried by the circuit breaker unit and disposed externally thereof, and means disposed externally of the circuit breaker for actuating the bridging members relative to the circuit breaker to connect said circuit breaker terminals and said conductor terminals, said bridging members and said actuating means being removable from the cell with the circuit breaker unit.

2. Switchgear apparatus comprising, an enclosing cell, a circuit breaker unit horizontally removable from the cell, terminals externally mounted on the circuit breaker in fixed relation thereto, conductor terminals fixed in the cell, bridging members carried by the circuit breaker unit and disposed externally thereof, and means disposed externally of the circuit breaker for actuating the bridging members vertically relative to the circuit breaker to connect said circuit breaker terminals and said conductor terminals, said bridging members and said actuating means being removable from the cell with the circuit breaker unit.

3. Switchgear apparatus comprising, an enclosing cell, a circuit breaker unit horizontally removable from the cell, a round terminal externally mounted on the circuit breaker in fixed relation thereto, a round terminal fixed in the cell in predetermined relation to the terminal on the breaker, a cylindrical sleeve slidably disposed on the breaker terminal externally of the breaker, and means disposed externally of the circuit breaker for actuating said sleeve to engage and disengage the terminal in the cell, said actuating means being carried by the breaker unit and removable therewith from the cell.

4. Switchgear apparatus comprising an enclosing cell, a circuit breaker unit removably disposed in the cell, said circuit breaker having terminals externally mounted thereon in fixed relation thereto, conductor terminals fixed in the cell, bridging members carried by the circuit breaker unit and disposed externally thereof, means disposed externally of the circuit breaker for moving the bridging members relative to the circuit breaker to connect and disconnect said circuit breaker terminals and said conductor terminals, means for tripping the circuit breaker mechanism, and interlocking means mounted on the cell structure and actuated by said means for moving the bridging members to operate said tripping means, said bridging members and the means for moving them relative to the circuit breaker being removable from the cell with the circuit breaker unit without interference by said interlocking means.

5. In switchgear apparatus, the combination with an enclosing cell having conductor terminals fixed therein and a circuit breaker unit removably disposed in the cell and having terminals externally mounted thereon in fixed relation thereto, of an isolating switch disposed externally of the circuit breaker for connecting and disconnecting the conductor terminals and the breaker terminals, said isolating switch being carried by the breaker unit and removable therewith from the cell, means carried by the breaker unit and disposed externally of the circuit breaker for operating the isolating switch, a tripping mechanism for the circuit breaker, and interlocking means actuated by operation of the isolating switch for operating said tripping mechanism.

6. In switchgear apparatus, the combination with an enclosing cell having conductor terminals fixed therein and a circuit breaker unit removably disposed in the cell and having terminals externally mounted thereon in fixed relation thereto, of an isolating switch disposed externally of the circuit breaker for connecting and disconnecting the conductor terminals and the breaker terminals, said isolating switch being carried by the breaker unit and removable therewith from the cell, means carried by the breaker unit and disposed externally of the circuit breaker for operating the isolating switch, a tripping mechanism for the circuit breaker, and interlocking means comprising a spring-biased rod and a pivotally mounted bar actuated by operation of the isolating switch for operating said tripping mechanism.

PAUL R. PIERSON.
GILBERT C. SINCLAIR.